(No Model.)

H. C. FRESHOUR.
BASIN PLUG.

No. 565,409. Patented Aug. 4, 1896.

WITNESSES
H. A. Lamb
S. V. Richardson

INVENTOR
Henry C. Freshour
By A. M. Wooster
Atty.

UNITED STATES PATENT OFFICE.

HENRY C. FRESHOUR, OF BRIDGEPORT, CONNECTICUT, ASSIGNOR TO HENRY O. CANFIELD, OF SAME PLACE.

BASIN-PLUG.

SPECIFICATION forming part of Letters Patent No. 565,409, dated August 4, 1896.

Application filed April 6, 1896. Serial No. 586,277. (No model.)

*To all whom it may concern:*

Be it known that I, HENRY C. FRESHOUR, a citizen of the United States, residing at Bridgeport, in the county of Fairfield and State of Connecticut, have invented certain new and useful Improvements in Basin-Plugs; and I do hereby declare the following to be a full, clear, and exact description of the invention, such as will enable others skilled in the art to which it appertains to make and use the same.

My invention relates to the manufacture of basin-plugs, and has for its object to provide improved means for securing the usual attaching-ring to the plug, it being desirable that the number of parts be reduced to the minimum, that the parts be so formed that the plug may be readily molded and the attaching device will be as inexpensive as possible, that the use of washers be dispensed with, and that the under side of the plug be so finished that it will not hold dirt.

With these ends in view I have devised the novel basin-plug of which the following description, in connection with the accompanying drawings, is a specification, numbers being used to designate the several parts.

Figure 1:
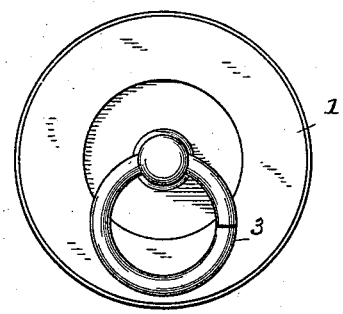
Figure 2:
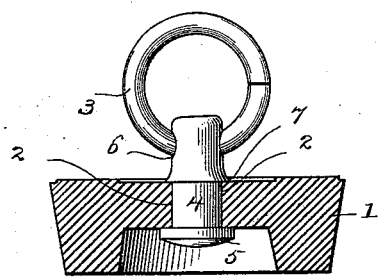
Figure 3:
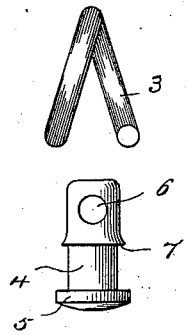

Figure 1 is a plan view of my novel basin-plug; Fig. 2, a section thereof; Fig. 3, a view of the stud and attaching-ring detached, and Fig. 4 is a view illustrating a modification in the form of the stud.

1 denotes the plug, which is ordinarily formed of rubber and molded to the required shape and is provided with a central opening 2, which extends through it, and 3 denotes the attaching-ring.

The essential feature of novelty in my improved basin-plug lies in a stud 4, which is provided at its lower end with a head 5, capable of preventing upward removal of the stud from the plug, and between its upper end and the head with a shoulder 7 of greater diameter than opening 2 through the plug, the body of the stud below the shoulder being preferably of suitable diameter to just fit closely in the opening in the plug. In assembling, the stud is passed through opening 2 from the under side, the material of the plug yielding sufficiently to allow the shoulder to pass through the opening, the body of the stud above the shoulder being reduced and tapered to facilitate the insertion of the stud into position. The head and the shoulder are formed at just sufficient distance apart so that when the stud is in place the head will lie closely against the under side of the plug and the shoulder will lie against the top of the plug. The usual attaching-ring may then be readily placed in a hole 6 at the upper end of the stud in the usual manner. It will of course be understood that in use the strain will all be upward and that the tendency will be to draw the stud out from the plug. This is prevented by head 5 on the under side of the plug, and it is essential in a device of this character that the head 5 be of a size larger than the shoulder, for the reason that it must be large enough to prevent upward removal of the stud through the plug, the weight of the water in a basin or bath-tub being such as to require a secure fastening. The stud must be inserted by an upward movement into the plug, and therefore the shoulder must be small enough to pass through the opening 2, and consequently smaller than the head 5. The action of the shoulder is to prevent the stud from slipping backward in the plug and to hold the stud in place in the plug, so that the stud will not move in either direction, the head engaging the under side of the plug closely and the shoulder engaging the upper side closely, which also prevents any accumulation of dirt.

Figure 4:
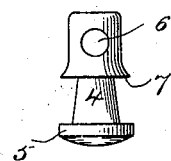

In Fig. 4 I have shown the body of the stud as tapering toward its upper end, which increases the width of the shoulder and causes the stud to hold still more firmly in the plug.

Having thus described my invention, I claim—

1. The combination with a molded rubber plug having an opening through it, of a stud adapted to pass through said opening, and having a head adapted to lie on the under side of the plug to prevent the latter from being drawn out, and a shoulder which engages the upper side of the plug, the body of the stud above the shoulder being tapered substantially as described for the purpose set forth.

2. A basin-plug comprising in its construction a disk-shaped plug of elastic material having a central opening, and a stud having a solid head at its lower end adapted to prevent the plug from being removed thereover, said stud having a shoulder smaller than the head, and adapted to be passed through the opening of the plug and to rest on the upper side thereof, the said disk closely fitting the shank of the plug to form a water-tight joint.

In testimony whereof I affix my signature in presence of two witnesses.

HENRY C. FRESHOUR.

Witnesses:
A. M. WOOSTER,
S. V. RICHARDSON.